US 6,654,039 B1

(12) United States Patent
Hollines, III et al.

(10) Patent No.: US 6,654,039 B1
(45) Date of Patent: Nov. 25, 2003

(54) METHOD, SYSTEM AND PROGRAM FOR SCROLLING INDEX SCANS

(75) Inventors: Robert J. Hollines, III, Salinas, CA (US); Christina Marie Lee, San Jose, CA (US); David L. Levish, San Jose, CA (US); San Yu Phoenix, Morgan Hill, CA (US); Michael R. Shadduck, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 09/687,856

(22) Filed: Oct. 13, 2000

(51) Int. Cl.[7] .............................. G06F 3/00; G06F 17/30
(52) U.S. Cl. ....................... 345/830; 345/968; 345/823; 345/860; 345/784; 715/503; 707/3
(58) Field of Search ................................. 345/968, 784, 345/786, 829, 830, 828, 821, 823, 856, 859, 860; 707/3, 4, 6, 5; 715/503, 509

(56) References Cited

U.S. PATENT DOCUMENTS

| | | | |
|---|---|---|---|
| 4,310,839 A | * 1/1982 | Schwerdt ................. 345/856 X |
| 5,337,405 A | * 8/1994 | Lindauer et al. ............ 715/503 |
| 5,544,354 A | * 8/1996 | May et al. ...................... 707/4 |
| 5,550,559 A | 8/1996 | Isensee et al. ............... 345/124 |
| 5,551,027 A | 8/1996 | Choy et al. ................... 395/600 |
| 5,926,820 A | * 7/1999 | Agrawal et al. ............ 707/5 X |
| 6,008,803 A | * 12/1999 | Rowe et al. ............ 345/830 X |
| 6,009,425 A | 12/1999 | Mohan ........................... 707/8 |
| 6,225,996 B1 | * 5/2001 | Gibb et al. .................. 345/784 |

* cited by examiner

Primary Examiner—Raymond J. Bayerl
(74) Attorney, Agent, or Firm—David W. Victor; Konrad Raynes Victor & Mann LLP

(57) ABSTRACT

A method, system and program for accessing records in a database object, such as an index or table. A cursor is maintained that points to a start entry in the database object. The database object has rows and columns of values. A runtime component receives a command to return a kth entry in the object having column values that satisfy predicates in a query statement. The runtime component calls a manager component that accesses entries in the database object to return the kth entry in the object having column values that satisfy the predicates. The manager component moves the cursor through sequential entries in the database object, in either the forward or reverse direction, until a kth entry that satisfies the predicates from the start entry is reached. The manager component positions the cursor to an entry that is the kth entry that satisfies the predicates from the start entry and returns data from the kth entry pointed to by the cursor to the runtime component.

27 Claims, 4 Drawing Sheets

METHOD, SYSTEM AND PROGRAM FOR SCROLLING INDEX SCANS

BACKGROUND OF THE INVENTION

1. Field of the Invention

The present invention relates to a method, system, and program for implementing scrollable cursors in a database program to perform backward and forward scans.

2. Description of the Related Art

Prior art database programs include a feature referred to as cursors. A cursor is a named control structure used by an application program to point to a row of interest within some set of rows and to retrieve rows from the set, possibly making updates and deletions. A cursor points to rows from a database table that satisfy a structured query language (SQL) query against the table. The rows in the table that satisfy the SQL query comprise a result set of data. In dynamic cursors, the row is evaluated at the time it is fetched.

When a cursor is opened or initialized, the current row position of the cursor is the first record or row in the table or index that satisfies the query. The application program may then issue fetch commands to move the cursor and fetch forward one row at a time until the desired row is reached, i.e., the tenth qualifying entry from the current cursor position or the tenth qualifying entry from the top. In the prior art, if the application wanted to fetch a previous row from the current position, then the application would have to start from fetching from the beginning entry of the index and fetch forward until the desired row was found. This process is inefficient because the cursor has to fetch through rows that have already processed. For this reason, there is a need in the art for improved techniques for scrolling backward.

Moreover, in the current art, to fetch forward or backward, a runtime module submits requests to a data manager component that controls access to a database table to return a next entry. The runtime module would then determine whether the returned entry satisfied the predicates included with the cursor. The runtime module would further determine if the cursor has advanced the requested number of entries that satisfy the predicates. If not, the runtime module would request the data manager and/or index manager for the next entry. This process can be quite slow to move forward a large number of entries because the runtime module must make numerous calls to a data manager module and index manager module to return each entry in the table or index and then determine whether the entries satisfy the predicates included in any WHERE statements provided with the cursor.

Thus, there is a need in the art for an improved approach for moving with a cursor backwards or forwards through a database table or index that avoids the overhead of current techniques.

SUMMARY OF THE PREFERRED EMBODIMENTS

To address the shortcomings in the prior art discussed above, preferred embodiments disclose a method, system, and program for accessing records in a database object. The database object has rows and columns of values. A cursor is maintained that points to a start entry in the database object. A runtime component receives a command to return a kth entry in the object having column values that satisfy predicates in a query statement. The runtime component calls a manager component that accesses entries in the database object to return the kth entry in the object having column values that satisfy the predicates. The manager component moves the cursor through sequential entries in the database object until a kth entry that satisfies the predicates from the start entry is reached. The manager component positions the cursor to an entry that is the kth entry that satisfies the predicates from the start entry and returns data from the kth entry pointed to by the cursor to the runtime component.

In further embodiments, the database object comprises an index to a base table, wherein the index has a subset of columns from the base table. Further, the manager component comprises a data manager that manages access to the base table and an index manager that manages access to the index. The query statement includes a select list of columns to return from an entry whose columns also satisfy the predicates in the query.

In such case, moving the cursor through the sequential entries in the index further comprises, for each cursor movement determining, with the index manager, whether columns in the index entry pointed to by the cursor satisfy the predicates. The index manager further determines whether the cursor points to the entry that is the kth entry to satisfy the predicates from the start entry if the columns in the index satisfy the predicates. The index manager moves the cursor to point to the next entry in the index if the columns in the index entry pointed to by the cursor do not satisfy the predicates.

Still further, for each cursor movement, the index manager determines whether predicates must be applied to non-index columns in the base table to satisfy the predicates. If so, the data manager determines whether non-index columns in the entry in the base table corresponding to the index entry pointed to by the cursor satisfy the predicates on the non-index columns in the base table if the non-index columns must be considered in order to determine whether the predicates in the query statement are satisfied or not satisfied.

Preferred embodiments provide a technique for scrolling a cursor forward and backward through a database object, such as an index or database table, in an efficient manner that minimizes the amount of traffic among the different database components. With preferred embodiments, the determination of whether index and/or base table entries satisfy cursor predicates is determined by the data manager and/or index manager components, thereby minimizing the number of calls that need to be performed to complete a fetch forward or backward operation with a dynamic cursor.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
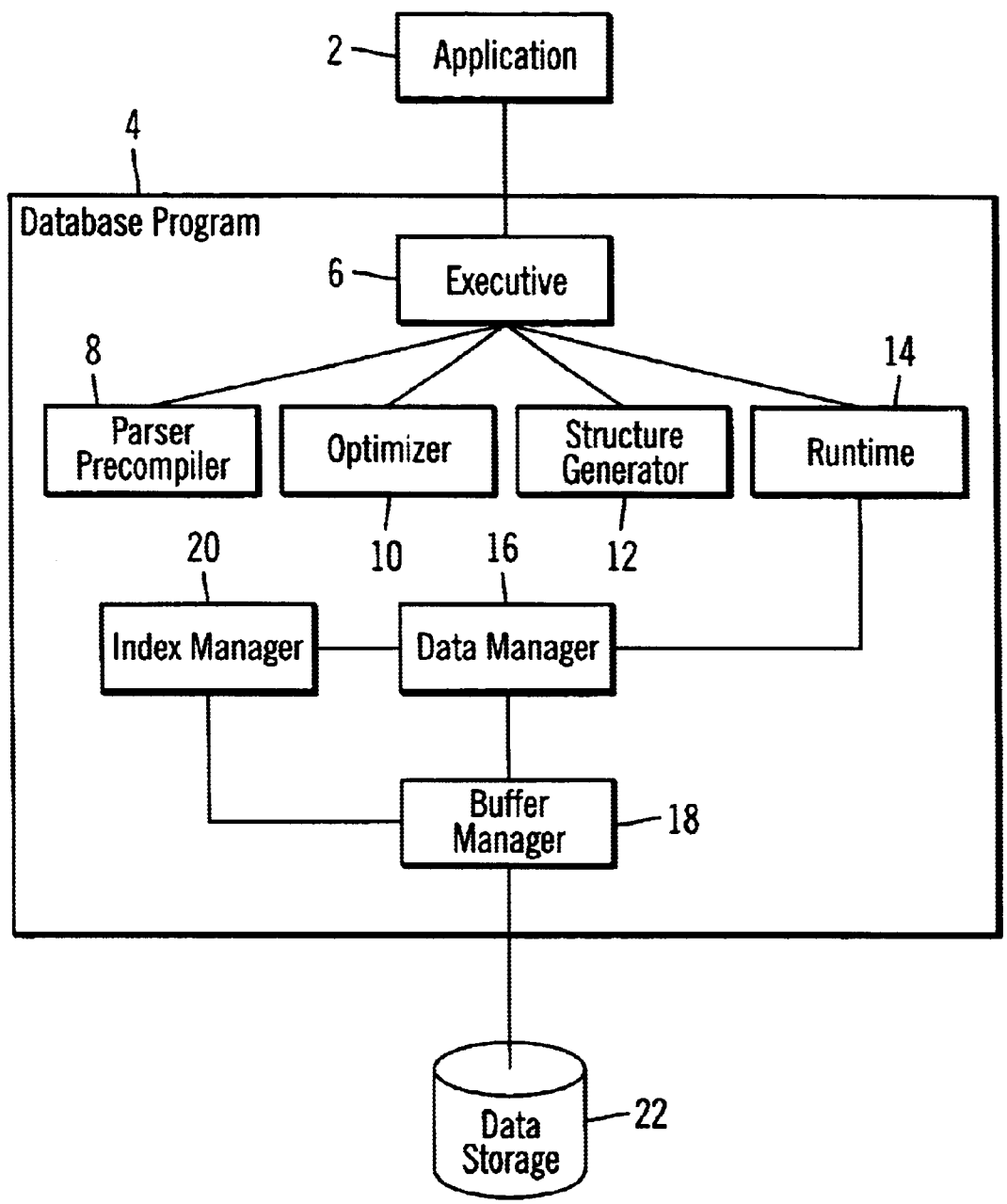
FIG. 1 illustrates a computing environment in which preferred embodiments are implemented.

FIG. 1 illustrates a computing environment in which preferred embodiments are implemented. An application program 2 provides an SQL query or cursor related commands to a database program 4. The database program includes the following program components: an executive program 6, a parser precompiler 8, an optimizer 10, a structure generator 12, a runtime program 14, a data manager 16, a buffer manager 18 and an index manager 20. The components of the database program 4 interpret the SQL and cursor related statements from the application 2 and retrieve data from database tables stored in data storage 22. The data storage 22 may comprise an array of interlinked disk drives, otherwise known as a Direct Access Storage Device (DASD), or any other data storage device known in the art, e.g., tape drives, optical disks, RAID array, etc.

The executive program 6 initially receives the database statements from the application 2. Upon detecting that the commands from the application 2 is an SQL query or cursor related command, the executive program 6 would call the parser precompiler 8 to parse the statements from the application program 2 and generate parse trees for the statements in a manner known in the art. The parser precompiler 8 would return the parsed statements to the executive 6. The executive program 6 would then call the optimizer program 10 to optimize the parse trees in a manner known in the art and return the optimized parse trees to the executive 6. The executive 6 would then call the structure generator 12 program to generate the control blocks and related data structures to implement the cursors in accordance with the preferred embodiments. The structure generator 12 receives as input the optimized parsed trees of the statements to build the runtime structure.

After the structure generator 12 creates the control blocks and data structures needed to implement the scrollable cursors, the executive 6 then calls the runtime program 14. The runtime program 14 calls the data manager 16 and issues commands to the data manager 16 to retrieve the requested data. Thus, the runtime program 14 instructs the data manager 16 on how to execute the query. The data manager 16 then determines the pages in the database that include the table that is subject to the query and calls the buffer manager 18 to access the pages in the table. The buffer manager 18 then accesses pages from the data storage 22. The data manager 16 would then determine which rows in the returned pages satisfy the query and return those qualifying rows to the runtime program 14. Further, the data manager 16 would also perform any updates or modifications to rows in the database tables. If the query is made against a database index as opposed to a table, the data manager 16 would call the index manager 20 to manage the operation and request pages for the index.

Figure 2:
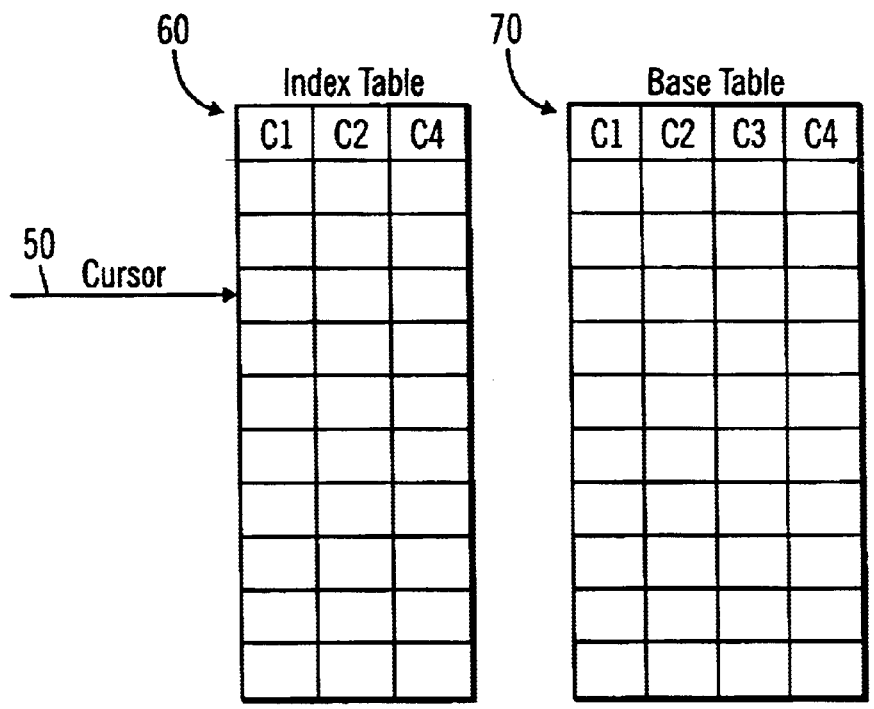
FIG. 2 illustrates a relationship between rows in a cursor result set and an index, which provides an index to a base table in accordance with preferred embodiments of the present invention.

FIG. 2 illustrates how a cursor 50 points to rows in an index 60 including columns C1, C2, and C4 from database table 70. In a dynamic cursor, the cursor 50 points to rows in the database table 60 or index that satisfy the predicates. The application 2 would issue a DECLARE statement to initialize a cursor. The declaration would include a SELECT statement specifying columns of the index 60 or database table 70 and a WHERE clause including one or more predicates to qualify rows of the database table 70. The runtime component 14 would pass the DECLARE command to the data manager 16 to initialize the cursor 50 to point to the first qualifying row in the index 60. If there was no index 60 on the database table 70, then the cursor 50 would be initialized to point to the first qualifying row of the table 70. An index 60 provides for faster searching of the rows in the database table 70.

Below is an example of a DECLARE cursor command to declare a dynamic scrollable cursor in accordance with the preferred embodiments. However, those skilled in the art will appreciate that numerous other formats may be used to implement a command to declare a dynamic scrollable cursor.

DECLARE cursor name DYNAMIC SCROLL CURSOR
  select statements

With a dynamic cursor, the number of entries in the index 60 that satisfy the cursor criteria is not fixed as the cursor scrolls the actual index 60. Thus, changes to the underlying table 70 and index 60 would be detected by the scrollable cursor when it scrolls through the rows of the index 60 using FETCH statements. A cursor declared as SCROLL can move backward and forward through the entries in the index 60 that satisfy the cursor predicates.

After the DECLARE statement is processed and the control blocks defining the structure of the cursor are generated, the executive 6 may then receive an OPEN statement from the application 2 to open the cursor, and initialize the cursor to point to the first qualifying entry in the index 60.

Figure 3:
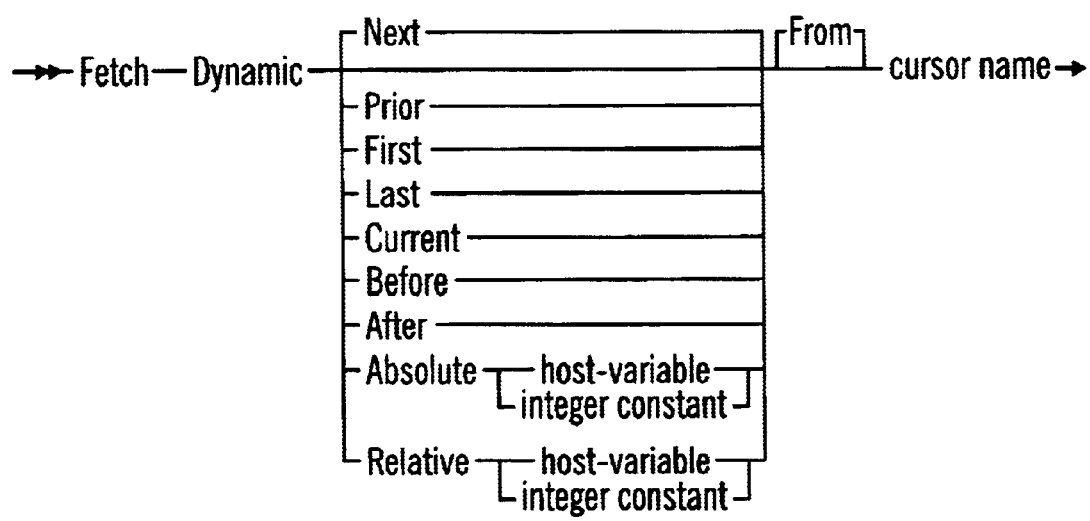
FIG. 3 illustrates a format for a cursor Fetch command in accordance with preferred embodiments of the present invention.

After the OPEN statement, the application 2 may issue FETCH statements to fetch rows of data from the index 60 that satisfy the predicates provided with the declaration of the scrollable cursor. FIG. 3 illustrates a format of a FETCH command. Those skilled in the art will appreciate that numerous alternative formats may be used to define the FETCH command.

The application 2 would issue FETCH statements to access rows in the index 60 that satisfy the predicates in the WHERE clause of the DECLARE statement. FIG. 3 illustrates the format of the FETCH statement. The FETCH operations include:

NEXT: positions the cursor on the next row of the index 60 that satisfies the predicates provided with the cursor relative to the current cursor position and fetches the row. NEXT is the default.

PRIOR: positions the cursor on the previous row of the index 60 that satisfies the predicates relative to the current cursor position and fetches the row.

FIRST: positions the cursor on the first qualifying row of the index 60 that satisfies the predicates and fetches the row.

LAST: positions the cursor on the last row of the index 60 that satisfies the predicates and fetches the row.

CURRENT: fetches the current row.

BEFORE: positions the cursor before the first row of the index 60 that satisfies the predicates AFTER: positions the cursor after the last row of the index 60 that satisfies the predicates ABSOLUTE: Evaluates the host variable or integer constant to an integral value k, and then moves the cursor position to the kth row in the index 60 that satisfies the predicates if k>0 or to k rows from the bottom of the table if k<0.

RELATIVE: Evaluates the host variable or integer constant to an integral value k, and then moves the cursor position to row in the index 60 that satisfies the predicates k rows after the current row if k>0 or to k rows before the current row if k<0.

Figure 4:
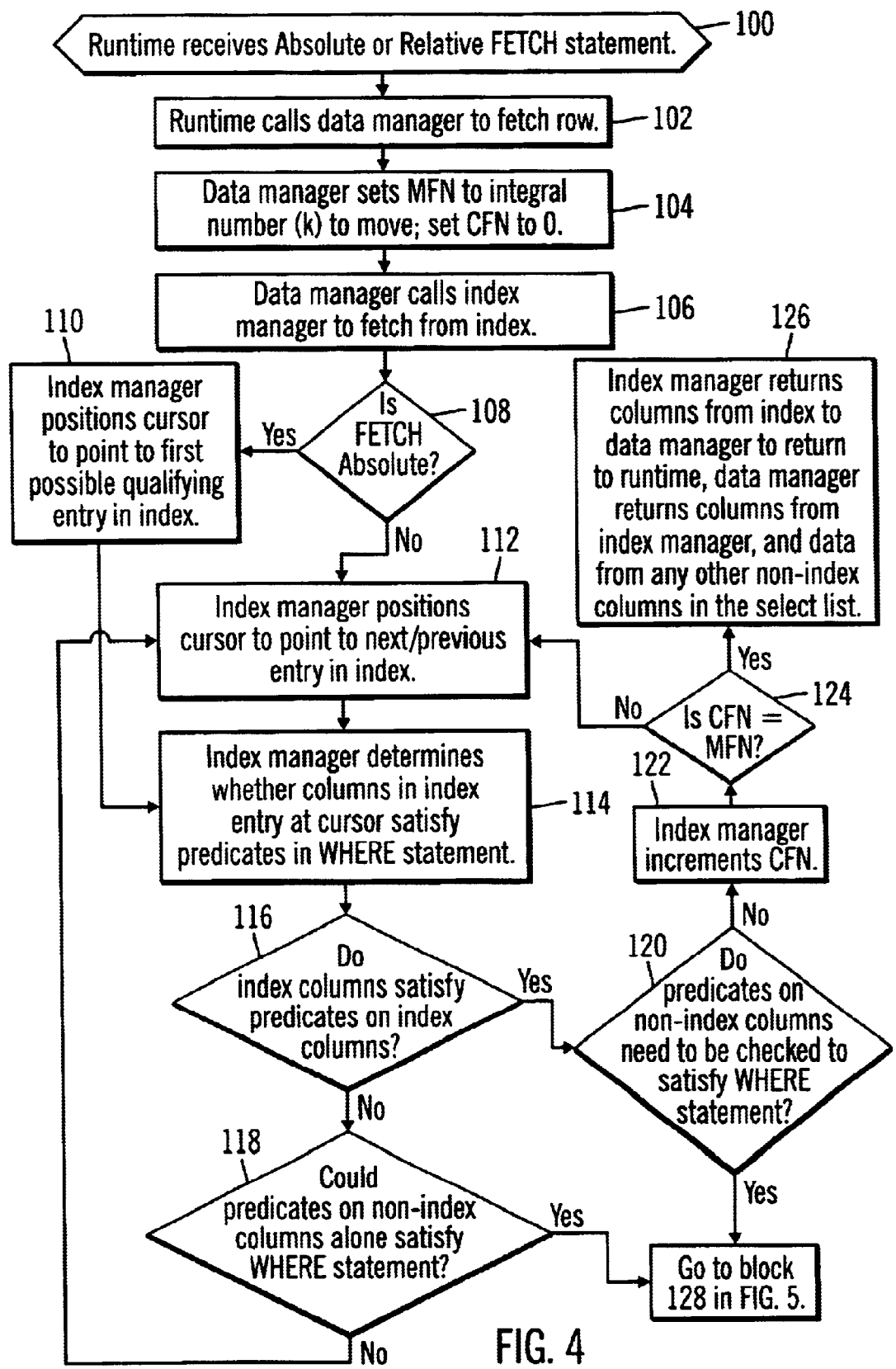
FIGS. 4 and 5 illustrate logic to scroll a cursor forward in accordance with preferred embodiments of the present invention.
Figure 5:
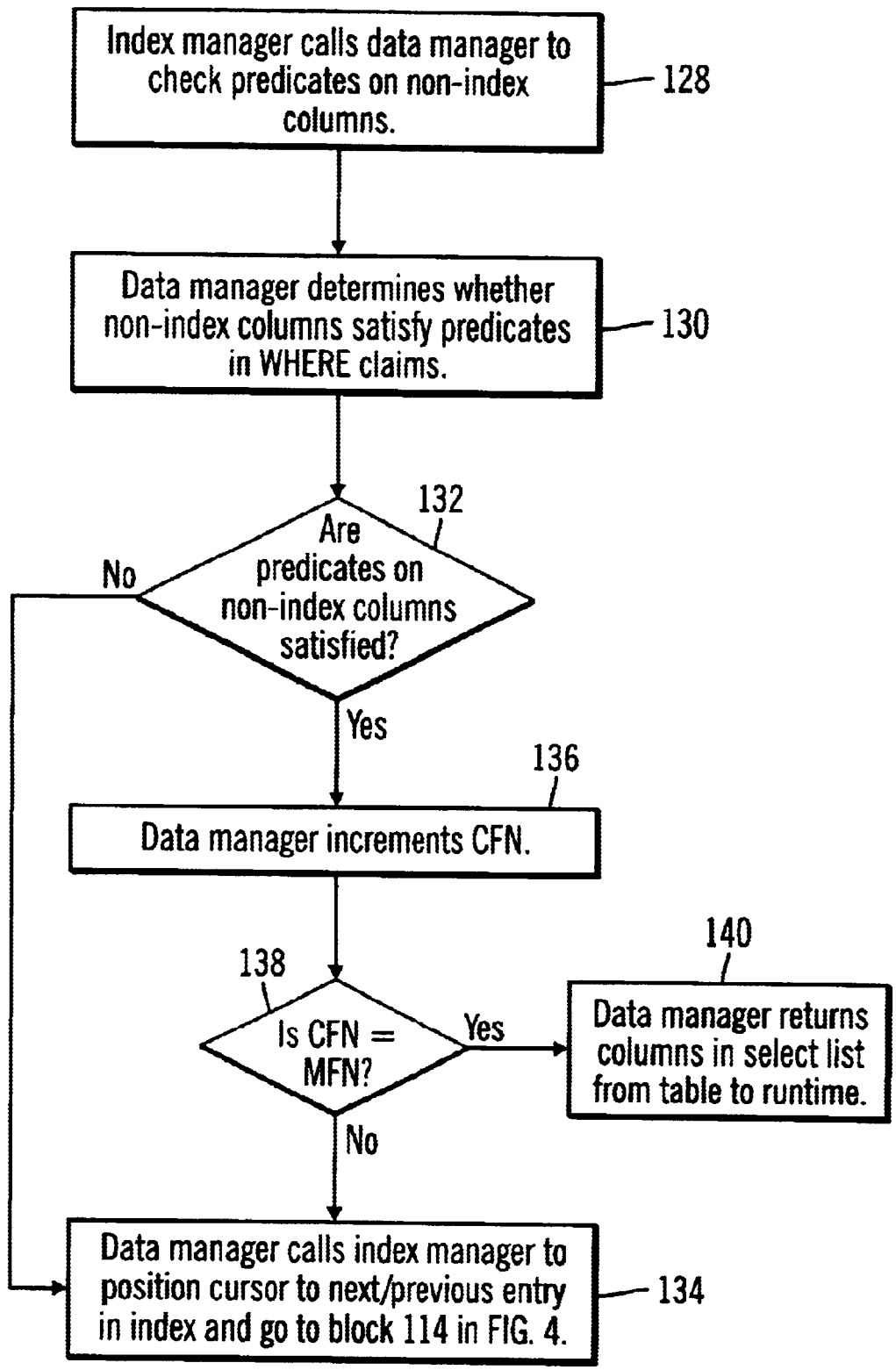

FIGS. 4 and 5 illustrate logic implemented in the components of the database program 4, including the runtime 14, data manager 16, and index manager 20 to FETCH forward and backward an absolute or relative number in a manner that optimizes scrollable operations in accordance with the preferred embodiments. In preferred embodiments, a current fetch number (CFN) and maximum fetch number (MFN) variables would be used during the scrolling operation. The maximum fetch number (MFN) comprises the number of k entries that satisfy the predicates of the WHERE clause that are scrolled forward or backward. The k parameter is provided with an ABSOLUTE or RELATIVE Fetch operation. The data manager 16 and index manager 20 use the current fetch number (CFN) as a counter to determine when they have scrolled forward or backward the maximum fetch number (MFN) of entries in the index 60 that satisfy the WHERE statement.

With respect to FIG. 4, control begins at block 100 with the runtime module 14 receiving an ABSOLUTE or RELATIVE FETCH statement from the application 2. The runtime 14 then calls (at block 102) the data manager 16 to fetch the row. The data manager 16 then sets (at block 104) the maximum fetch number (MFN) to the integer number k provided with the absolute or relative FETCH statement, and sets the current fetch number (CFN) counter to zero. The data manager 16 then calls (at block 106) the index manager 20 to fetch the requested row from the index, which may require forward or backward movement. If (at block 108) the statement is an ABSOLUTE FETCH, then the index manager 20 positions (at block 110) the cursor 50 to point to the first qualifying entry in the index 60. Depending on the WHERE clause, the first possible qualifying entry may not be the first entry in the index 60 if the WHERE clause specifies a range for a column that excludes the first entry.

From the "No" branch of block 108, control proceeds to block 112 where the index manager 20 positions the cursor 50 to point to the next/previous entry in the index 60. From block 110 or block 112, the index manager determines (at block 114) whether columns in the index entry at the cursor satisfy predicates toward the index 60 columns in the WHERE statement. If (at block 116) the index 60 columns do not satisfy WHERE statement predicates on the index columns and the non-index columns alone could not satisfy the WHERE statement (at block 118), then the current index 60 entry pointed to by the cursor 50 does not satisfy the predicates. In such case, the index manager 20 proceeds back to block 112 to position the cursor 50 to the next/previous entry in the index 60. In this way, the base table 70 is not checked if failure of the columns in the index 60 to satisfy the predicates on the index column would cause the entire row to fail the WHERE statement condition. This would occur if the predicates on the index and non-index columns both must be met, i.e., an AND operator, in order for the WHERE statement to be satisfied.

If at block 116 the index 60 columns do satisfy the predicates on the index columns and if (at block 120) the predicates on the non-index columns do not need to be checked in order to satisfy the WHERE statement, then the index manager 20 increments (at block 122) the current fetch number (CFN) as the current entry brings the cursor one qualifying entry closer to the kth entry. The index manager 20 then determines (at block 124) whether the current fetch number (CFN) is equal to the maximum fetch number (MFN). If so, then the cursor 50 has scrolled backward/forward the k entries requested in the FETCH statement and the index manager 20 returns (at block 126) the columns from the index in the select list to the data manager 18 to return to the runtime module 14. If the select list includes non-index columns, then the data manager 18 would return data from the table 70 for any non-index columns in the select list. Otherwise, if the current fetch number (CFN) is less than the maximum fetch number (MFN), then the cursor 50 has not scrolled the requested k qualifying entries in the ABSOLUTE or RELATIVE FETCH and control proceeds to block 112 to consider the next entry in the index 60. The situation where the index columns satisfy the predicates on the index columns and the non-index columns do not need to be checked would occur in two situations. One, if there were no predicates on the non-index columns or, two, if satisfaction of either the index column predicates or non-index column predicates would satisfy the WHERE statement, i.e., an OR operator condition.

If the predicates on the non-index columns need to be checked to determine whether the row satisfies the WHERE statement after examining the predicates on the index column from the "Yes" branch of block 120 or the "Yes" branch of block 118, then control proceeds to block 128 in FIG. 5 where the index manager 20 calls the data manager 18 to check predicates in the WHERE statement on the non-index columns in the table 70. In response, the data manager 18 determines (at block 130) whether the non-index columns satisfy the predicates on the WHERE statement. If (at block 132) the predicates on the non-index columns are not satisfied, then the entire entry does not satisfy the predicates and the data manager 18 calls (at block 134) the index manager 20 to position the cursor 50 to point to the next/previous entry in the index 60 and proceeds to block 114 in FIG. 4 to consider this next entry. Otherwise, if the entry qualifies according to the WHERE statement predicates, then the data manager 18 increments (at block 136) the current fetch number (CFN) and determines (at block 138) whether the current fetch number (CFN) equals the maximum fetch number (MFN). If so, then the current cursor 60 position is the requested qualifying entry. In such case, the data manager 18 returns (at block 140) the columns in the select list from the table 70 to the runtime module 14. Otherwise, if the cursor 50 has not moved forward/backward the requested number of k entries, then the data manager 18 calls (at block 134) the index manager 20 to position the cursor 50 the next/previous entry in the index 60 and proceeds to block 114 in FIG. 4.

With the logic of FIGS. 4 and 5, the database program 4 implements dynamic scrollable cursors in a manner that minimizes the overhead of fetch related operations that occur among the runtime 14 and the data 16 and index 18 managers. With the preferred embodiments, the runtime 14 provides the data manager 16 the FETCH statement to scroll forward or backward k positions. The data manager 16 would call the index manager 20 to check the FETCH predicates against index columns. The index manager 16 would perform a qualifying operations to the extent possible. Only if the index manager 16 could not alone qualify rows, i.e., a partial qualification, such as the case if both index and non-index columns must qualify, then the index manager 20 would call the data manager 18 to qualify any non-index columns.

With the preferred embodiments, the runtime component that receives the commands from the application pushes down scrolling operations to the level of the manager component, such as the data manager 16 and index manager 20, that controls access to the database table or index where the scrolling occurs. In this way, the number of transactions and communications among the runtime component, data manager 16 and index manager 20 are minimized. Preferred embodiments improve performance of the scrolling index by eliminating the overhead of repeated calls from the runtime 14 and data manager 16 components by having the index manager 20 perform as many qualifying operations as possible.

Alternative Embodiments and Conclusions

This concludes the description of the preferred embodiments of the invention. The following describes some alternative embodiments for accomplishing the present invention.

The preferred embodiments may be implemented as a method, apparatus or program using standard programming and/or engineering techniques to produce software, firmware, hardware, or any combination thereof. The programs and code defining the functions of the preferred embodiment can be delivered to a computer via a variety of information bearing media, which include, but are not limited to, computer-readable devices, firmware, programmable logic, memory devices (e.g., EEPROMs, ROMs, PROMs, RAMs, SRAMs, etc.) "floppy disk," CD-ROM, a file server providing access to the programs via a network transmission line, wireless transmission media, signals propagating through space, radio waves, infrared signals, etc. Still further the code in which the preferred embodiments are implemented may comprise hardware or electronic devices including logic to process data. Of course, those skilled in the art will recognize that many modifications may be made to this configuration without departing from the scope of the present invention.

In preferred embodiments, fetch operations were performed against a database index which includes a key column and pointer to an entry in a database table. In further embodiments, the cursor may point and move forward and backward on database objects other than an index, such as a table.

In preferred embodiments, an index was available on the table. However, in embodiments where there is no index for the base table, then the data manager would perform all the qualifying operations on the database table and return the row of columns in the select list requested by the FETCH command.

The preferred logic of FIGS. 4 and 5 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In preferred embodiments, FIG. 1 described a particular relationship of database components to interpret the cursor commands and perform the requested operation with respect to the result and base tables. In alternative embodiments, different database program structures may be utilized or different components may be used to perform operations described herein as performed by a certain component. In other words, the preferred embodiment cursor and logic for executing cursor related statements may be implemented in different database program architectures.

In summary, the present invention provides a system, method, and program for accessing records in a database object. The database object has rows and columns of values. A cursor is maintained that points to a start entry in the database object. A runtime component receives a command to return a kth entry in the object having column values that satisfy predicates in a query statement. The runtime component calls a manager component that accesses entries in the database object to return the kth entry in the object having column values that satisfy the predicates. The manager component moves the cursor through sequential entries in the database object until a kth entry that satisfies the predicates from the start entry is reached. The manager component positions the cursor to an entry that is the kth entry that satisfies the predicates from the start entry and returns data from the kth entry pointed to by the cursor to the runtime component.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing records in a database object having rows and columns of values, comprising:

maintaining a cursor pointing to a start entry in the database object;

receiving, with a runtime component, a command to return a kth entry in the database object having column values that satisfy predicates in a query statement;

calling, with the runtime component, a manager component that accesses entries in the database object to return the kth entry in the object having column values that satisfy the predicates;

moving the cursor, with the manager component, through sequential entries in the database object until the manager component determines a kth entry that satisfies the predicates from the start entry;

positioning the cursor, with the manager component, to an entry that is the kth entry that satisfies the predicates from the start entry; and returning, with the manager component, data from the kth entry pointed to by the cursor to the runtime component.

2. The method of claim 1, wherein the manager component further performs:

positioning the cursor to point to a first qualifying entry in the object if the command comprises an ABSOLUTE fetch command.

3. The method of claim 1, wherein the database object comprises an index to a base table, wherein the index has a subset of columns from the base table.

4. The method of claim 3, wherein the manager component comprises a data manager that manages access to the base table and an index manager that manages access to the index, wherein the query statement includes a select list of columns to return from an entry whose columns also satisfy the predicates in the query, wherein moving the cursor through the sequential entries in the index further comprises, for each cursor movement:

determining, with the index manager, whether columns in the index entry pointed to by the cursor satisfy the predicates;

determining, with the index manager, whether the cursor points to the entry that is the kth entry to satisfy the predicates from the start entry if the columns in the index satisfy the predicates, wherein returning the data from the kth entry comprises returning data from the columns in the select list; and moving, with the index manager, the cursor to point to the next entry in the index if the columns in the index entry pointed to by the cursor do not satisfy the predicates.

5. The method of claim 4, wherein the runtime component calls the data manager to fetch the kth entry satisfying the predicates and the data manager calls the index manager to fetch the kth entry satisfying the predicates.

6. The method of claim 4, further performing, for each cursor movement:

determining, with the index manager, whether predicates must be applied to non-index columns in the base table to satisfy the predicates;

determining, with the data manager, whether non-index columns in the entry in the base table corresponding to the index entry pointed to by the cursor satisfy the predicates on the non-index columns if non-index columns in the base table must be considered in order to determine whether the predicates in the query statement are satisfied or not satisfied.

7. The method of claim 6, wherein moving the cursor through sequential entries until the kth entry satisfying the predicates is determined, further comprises:

modifying a counter with the index manager if the index manager determines that the entry satisfies the predicates by having the index columns satisfy the predicates, wherein the counter indicates when the kth entry satisfying the predicates is located; and modifying the counter with the data manager if the data manager determines that the entry satisfies the predicates by having the non-index columns satisfy the predicates.

8. The method of claim 7, wherein returning the data from the kth entry pointed to by the cursor further comprises:

returning, with the index manager, data from the index columns to the data manager if the index manager determines that the index entry is the kth index entry to satisfy the predicates;

returning, with the data manager, the data for the index entry received from the index manager to the runtime component; and returning, with the data manager data from the base table columns to the runtime component if the data manager determines that the index entry is the kth index entry to satisfy the predicates.

9. The method of claim 1, wherein moving the cursor, with the management component, through the sequential entries in the database object for each cursor movement further comprises:

moving the cursor to point to the next entry in the object and incrementing a counter if the columns in the object entry pointed to by the cursor do not satisfy the predicates; and determining whether the counter equals k if the columns in the index satisfy the predicates, wherein the entry pointed to by the cursor is the kth entry if the counter equals k.

10. A system for accessing records in a database object having rows and columns of values, comprising:

a storage device;

a database object stored in the storage device;

a processor capable of accessing the storage device including the database object;

a runtime component and manager component programs embedded in a computer readable medium, wherein the processor executes the runtime and manager component programs to perform:

(i) maintaining a cursor pointing to a start entry in the database object;

(ii) receiving, with the runtime component, a command to return a kth entry in the object having column values that satisfy predicates in a query statement;

(iii) calling, with the runtime component, the manager component that accesses entries in the database object to return the kth entry in the object having column values that satisfy the predicates;

(iv) moving the cursor, with the manager component, through sequential entries in the database object until the manager component determines a kth entry that satisfies the predicates from the start entry;

(v) positioning the cursor, with the manager component, to an entry that is the kth entry that satisfies the predicates from the start entry; and (vi) returning, with the manager component, data from the kth entry pointed to by the cursor to the runtime component.

11. The system of claim 10, wherein the processor further executes the manager component to perform:

positioning the cursor to point to a first qualifying entry in the object if the command comprises an ABSOLUTE fetch command.

12. The system of claim 10, wherein the database object comprises an index to a base table, wherein the index has a subset of columns from the base table.

13. The system of claim 12, wherein the manager component comprises a data manager that manages access to the base table and an index manager that manages access to the index, wherein the query statement includes a select list of columns to return from an entry whose columns also satisfy the predicates in the query, wherein moving the cursor through the sequential entries in the index further comprises the processor executing the index manager to perform for each cursor movement:

determining whether columns in the index entry pointed to by the cursor satisfy the predicates;

determining whether the cursor points to the entry that is the kth entry to satisfy the predicates from the start entry if the columns in the index satisfy the predicates, wherein returning the data from the kth entry comprises returning data from the columns in the select list; and moving the cursor to point to the next entry in the index if the columns in the index entry pointed to by the cursor do not satisfy the predicates.

14. The system of claim 13, wherein the runtime component calls the data manager to fetch the kth entry satisfying the predicates and the data manager calls the index manager to fetch the kth entry satisfying the predicates.

15. The system of claim 14, wherein the processor executes the index manager and data manager to perform, for each cursor movement:

determining, with the index manager, whether predicates must be applied to non-index columns in the base table to satisfy the predicates;

determining, with the data manager, whether non-index columns in the entry in the base table corresponding to the index entry pointed to by the cursor satisfy the predicates on the non-index columns if non-index columns in the base table must be considered in order to determine whether the predicates in the query statement are satisfied or not satisfied.

16. The system of claim 15, wherein moving the cursor through sequential entries until the kth entry satisfying the predicates is determined, further comprises:

modifying a counter with the index manager if the index manager determines that the entry satisfies the predicates by having the index columns satisfy the predicates, wherein the counter indicates when the kth entry satisfying the predicates is located; and modifying the counter with the data manager if the data manager determines that the entry satisfies the predicates by having the non-index columns satisfy the predicates.

17. The system of claim 16, wherein returning the data from the kth entry pointed to by the cursor further comprises:

returning, with the index manager, data from the index columns to the data manager if the index manager determines that the index entry is the kth index entry to satisfy the predicates;

returning, with the data manager, the data for the index entry received from the index manager to the runtime component; and returning, with the data manager data from the base table columns to the runtime component if the data manager determines that the index entry is the kth index entry to satisfy the predicates.

18. The system of claim 10, wherein moving the cursor, with the management component, through the sequential entries in the database object for each cursor movement further comprises:

moving the cursor to point to the next entry in the object and incrementing a counter if the columns in the object entry pointed to by the cursor do not satisfy the predicates; and determining whether the counter equals k if the columns in the index satisfy the predicates, wherein the entry pointed to by the cursor is the kth entry if the counter equals k.

19. A program for accessing records in a database object having rows and columns of values, wherein the program comprises a runtime component and manager component code embedded in a computer readable medium that is capable of causing a processor to perform:

maintaining a cursor pointing to a start entry in the database object;

receiving, with the runtime component, a command to return a kth entry in the object having column values that satisfy predicates in a query statement;

calling, with the runtime component, the manager component that manages accesses to the database object to return the kth entry in the object having column values that satisfy the predicates;

moving the cursor, with the manager component, through sequential entries in the database object until the manager component determines a kth entry that satisfies the predicates from the start entry;

positioning the cursor, with the manager component, to an entry that is the kth entry that satisfies the predicates from the start entry; and returning, with the manager component, data from the kth entry pointed to by the cursor to the runtime component.

20. The program of claim 19, wherein the manager component is further capable of causing the processor to perform:

positioning the cursor to point to a first qualifying entry in the object if the command comprises an ABSOLUTE fetch command.

21. The program of claim 19, wherein the database object comprises an index to a base table, wherein the index has a subset of columns from the base table.

22. The program of claim 21, wherein the manager component comprises a data manager that manages access to the base table and an index manager that manages access to the index, wherein the query statement includes a select list of columns to return from an entry whose columns also satisfy the predicates in the query, wherein the index manager causes the processor to move the cursor through the sequential entries in the index, for each cursor movement, by:

determining whether columns in the index entry pointed to by the cursor satisfy the predicates;

determining whether the cursor points to the entry that is the kth entry to satisfy the predicates from the start entry if the columns in the index satisfy the predicates, wherein returning the data from the kth entry comprises returning data from the columns in the select list; and moving the cursor to point to the next entry in the index if the columns in the index entry pointed to by the cursor do not satisfy the predicates.

23. The system of claim 22, wherein the runtime component calls the data manager to fetch the kth entry satisfying the predicates and the data manager calls the index manager to fetch the kth entry satisfying the predicates.

24. The program of claim 22, wherein the index manager and data manager are further capable of causing the processor to perform, for each cursor movement:

determining, with the index manager, whether predicates must be applied to non-index columns in the base table to satisfy the predicates;

determining, with the data manager, whether non-index columns in the entry in the base table corresponding to the index entry pointed to by the cursor satisfy the predicates on the non-index columns if non-index columns in the base table must be considered in order to determine whether the predicates in the query statement are satisfied or not satisfied.

25. The program of claim 24, wherein moving the cursor through sequential entries until the kth entry satisfying the predicates is determined, further comprises:

modifying a counter with the index manager if the index manager determines that the entry satisfies the predicates by having the index columns satisfy the predicates, wherein the counter indicates when the kth entry satisfying the predicates is located; and modifying the counter with the data manager if the data manager determines that the entry satisfies the predicates by having the non-index columns satisfy the predicates.

26. The program of claim 25, wherein returning the data from the kth entry pointed to by the cursor further comprises:

returning, with the index manager, data from the index columns to the data manager if the index manager determines that the index entry is the kth index entry to satisfy the predicates;

returning, with the data manager, the data for the index entry received from the index manager to the runtime component; and returning, with the data manager data from the base table columns to the runtime component if the data manager determines that the index entry is the kth index entry to satisfy the predicates.

27. The program of claim 19, wherein moving the cursor, with the management component, through the sequential entries in the database object for each cursor movement further comprises:

moving the cursor to point to the next entry in the object and incrementing a counter if the columns in the object entry pointed to by the cursor do not satisfy the predicates; and determining whether the counter equals k if the columns in the index satisfy the predicates, wherein the entry pointed to by the cursor is the kth entry if the counter equals k.

* * * * *